United States Patent [19]
Eggert, Jr.

[11] 3,859,625
[45] Jan. 7, 1975

[54] INTERLOCK SAFETY BELT SYSTEM

[75] Inventor: Walter S. Eggert, Jr., Huntingdon Valley, Pa.

[73] Assignee: The Budd Company, Philadelphia, Pa.

[22] Filed: May 21, 1973

[21] Appl. No.: 362,150

[52] U.S. Cl. ........... 340/52 E, 180/82 A, 180/82 B, 180/82 C
[51] Int. Cl. ............................................ B60r 21/10
[58] Field of Search ............ 180/82 C; 280/150 SB; 340/52 E, 278; 188/110, 265

[56] References Cited
UNITED STATES PATENTS

| | | | |
|---|---|---|---|
| 2,751,054 | 6/1956 | Del Re | 188/265 |
| 3,119,477 | 1/1964 | Ryder | 188/110 X |
| 3,226,674 | 12/1965 | Eriksson | 340/278 X |
| 3,269,483 | 8/1966 | Garner | 340/278 X |
| 3,438,455 | 4/1969 | Redmond | 180/82 C |
| 3,521,723 | 7/1970 | Snodgrass | 180/82 C |
| 3,737,850 | 6/1973 | Kopp | 340/52 E |

*Primary Examiner*—Kenneth H. Betts

[57] ABSTRACT

This application discloses a seat belt safety system for passenger motor vehicles which provides a positive mechanical interlock of a fail-safe type dependent on the seat belt and seat-occupied condition which applies a positive mechanical interlock on a travel control means by electro-mechanical operation when a seat is occupied if the belt is not fastened, leaving the ignition system independent of and unaffected by the safety belt system; also specific improved indicating or signal means to show the safety belt condition while the vehicle is at rest or travelling.

7 Claims, 3 Drawing Figures

PATENTED JAN 7 1975

3,859,625

INTERLOCK SAFETY BELT SYSTEM

BACKGROUND

There is an accelerated demand for passenger safety systems in motor vehicles, the most common system at present including seat belts. There have been many proposed systems which are meant to provide assurance that the belts are fastened on the passengers before the vehicle can be put into travel control. Many of these proposals make engine ignition and operation dependent on seat belt application but this is not satisfactory because it is usually desirable to assure proper engine operation prior to passenger seating and travel.

There have been some proposals for travel control which provides a positive mechanical interlock to prevent vehicle travel unless the belts of all occupied seats are fastened. The patent of Redmond U.S. Pat. No. 3,438,455 shows such a mechanical interlock for the gear selector control. However, in the Redmond system the mechanical interlock is positively applied by a spring and retracted by electro-mechanical means. This is not satisfactory because it is not of a fail-safe type, that is, if the belt-fastened safety means does not function the spring will keep the interlock applied and the vehicle cannot be made to travel at all. Such mechanisms are usually not readily accessible to a driver for remedy of a locked condition.

SYNOPSIS OF INVENTION

The present invention provides a mechanical interlock for the travel control means which is independent of the ignition system, after first energization, and which is of the fail-safe type in which the interlock is normally positively retracted, as by a spring, and extended by electro-mechanical means when a seat is occupied and its belt unfastened. This not only allows normal operation of the vehicle if the belt system is inoperative but also avoids having a live circuit through the belt system except in non-travel condition. To have current on the system at all times during travel is not only uneconomical but unsafe.

The system also includes an improved signal or indicating arrangement which will operate a first signal means, such as a lamp, at any time when any seat belt is unfastened, whether standing or travelling, and which will operate a second signal, such as a buzzer, when a seat belt of an occupied seat is unfastened only while the vehicle is in travel condition.

DRAWINGS

The objects, advantages, and various features of novelty of the invention will be apparent from the following description of specific embodiments, reference being made to the accompanying drawings thereof, wherein.

SPECIFIC EMBODIMENT

Figure 1:
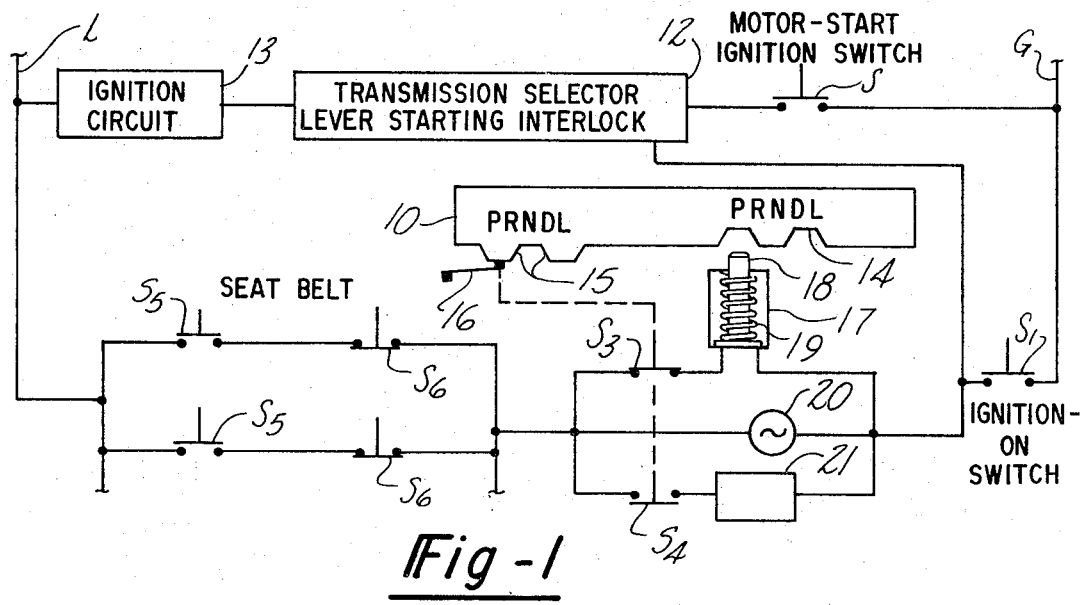
FIG. 1 is a diagram of a system in which the gear selector sector is locked in park or neutral position if the belt of an occupied seat is not fastened.

Referring first to FIG. 1 wherein the travel control means is the hand selector lever, the travel selector sector, which is usually arcuate, is shown as a movable bar 10 which moves past an indicator panel (not shown), the travel positions being marked P, R, N, D, L on the bar to indicate the present usual arrangement of Park, Reverse, Neutral, Drive and Low. It will be assumed that the vehicle will be provided with the usual interlocks to confine starting and engine running to the Park or Neutral positions, or both, as may be provided on the vehicle.

The line L and ground G are as usual on a vehicle, the battery being omitted. There is an ignition or starting switch S which connects directly to the selector starting interlock 12 and ignition circuit 13. The motor can be started and kept running without regard to the safety system hereby provided.

A safety circuit ignition interlock switch S1 is provided, this being normally open and closed when the ignition switch S is closed in engine-run position to make the safety circuit subservient to the ignition switch in starting but independent thereafter.

The drive selector sector bar 10 is shown as having notches 14 at the starting positions P and N. The selector sector bar 10 also has switch operating cam elements 15 at the P and N positions for actuating a switch operator 16 which actuates switches S3 and S4. Switch S3 is closed and switch S4 is opened when the bar 10 is in the P or N positions.

Closure of switch S3 closes part of a circuit for energizing a relay coil 17 for moving a shift blocking detent pin 18 outward into extended position against a spring 19, the spring normally holding the detent pin in retracted position. The detent pin, when extended, engages a notch 14 in the P or N position of the sector bar, whichever one is used for starting the engine, and prevents shifting to a drive position until the detent pin has been retracted.

However, the coil of the detent relay 17 is in series-parallel with normally open seat switches S5 and normally closed safety belt switches S6 so that if a passenger, including driver, occupies a seat to close a switch S5 the detent will be extended to lock the shift sector until the belt for the occupied seat is fastened to open the switch S6. The same condition exists for any seat which is occupied until the safety belt is fastened.

A lamp 20 is provided to indicate at any time, whether standing or travelling, when any passenger is seated without having the belt for that seat fastened.

A buzzer 21 is also provided but this is activated only if a seat belt of an occupied seat is unfastened during travel, being subservient to switch S4 which, as noted before, is held open when the drive selector is in the P or N position and the belts are not fastened.

Figure 2:
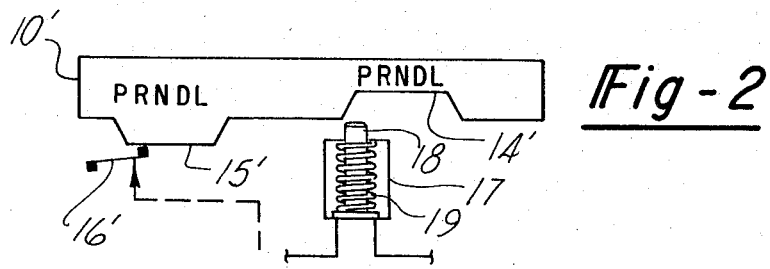
FIG. 2 is a view like part of FIG. 1 showing how the system can be modified to allow reverse drive while providing non-forward-drive interlock in the park and neutral positions.

The arrangement shown in FIG. 2 is similar to that of FIG. 1 but the sector bar 10' is notched at 14' to permit shifting into reverse while locked against shifting to forward running position until the belts of all occupied seats are fastened. This is accomplished by having the notch 14' elongated to embrace the P, R and N positions and the cam 15' also elongated to the same extent for actuating the switch operator 16'. There is little danger to occupants while backing and it can be convenient to the driver to have this option while still protecting the occupants against danger in all forward drive positions where the vehicle is likely to travel at higher speeds.

Figure 3:
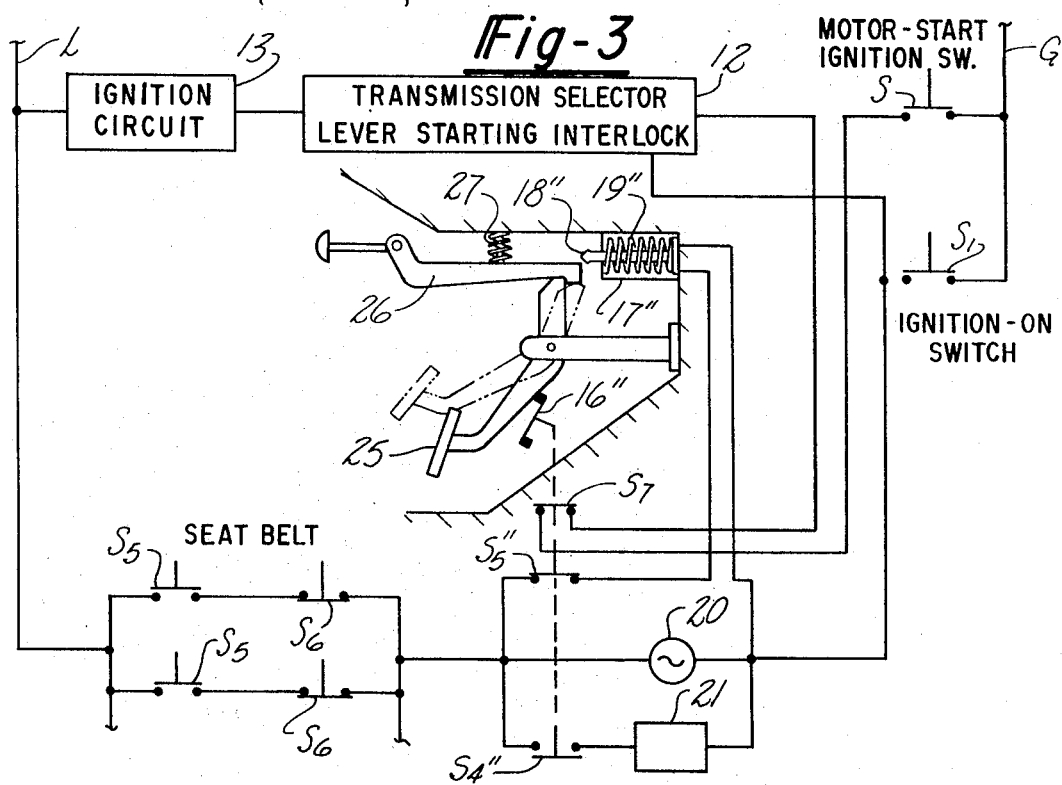
FIG. 3 is a diagram of a system in which the travel control means which is placed in the interlock arrangement is the emergency foot brake pedal.

The arrangement shown in FIG. 3 is similar to that of FIGS. 1 and 2 except that the foot brake pedal is the travel control means instead of the drive selector sector.

There is the line L, ground G. ignition switch S, selector starting interlock 12, ignition circuit 13, ignition interlock switch S1, seat switch S5, belt switch S6, lamp 20 and buzzer 21.

An emergency foot brake pedal 25 has a hand latch 26 which is urged into locking position by a spring 27. A detent 18" is biased to retracted position by a spring 19" and is extended by a solenoid coil 17" if any seat occupied does not have its seat belt fastened.

When the brake pedal 25 is depressed into brake-applying position (full lines) it closes a normally open switch by action on switch operator 16", the switch S7 permitting action of the interlock 12. Action of operator 16" also closes switch S5" and opens switch S4". This assures that the emergency brake must be applied before the vehicle can be moved from the restricted position unless the belts of all occupied seats are fastened.

As before, the indicator lamp 20 will be lighted at any time, stopped or travelling, when the belt of any occupied seat is not fastened; and the buzzer 21 will sound during travel if the belt of any occupied seat is not fastened. Backing is not regarded as travel which is always dangerous or forbidden.

Although the driver can usually be depended upon to make certain that the foot brake is properly applied when the vehicle is at rest before turning the starting key and although the vehicle cannot be started in travel while the brake is applied and the brake cannot be released until the belts of all occupied seats have been fastened, it may still be desirable to provide means for assuring that the vehicle cannot travel unless the brake has previously been properly applied. Herein this is accomplished by providing a switch S7 for the selector starting interlock which is closed by the operator 16" when the foot pedal brake is fully applied. This assures that the engine cannot be started unless the selector is in a specific restrictive position, or positions, after the switch has been turned off and unless the belts of seated passengers have all been properly applied.

That is to say, while the engine can be started in the usual way by having the selector in a certain position, the brake interlock assures that the brake must be set before the engine can be started in the selected position, and thereafter the ignition circuit is completely independent of the safety belt circuit and the safety belt circuit is completely independent of the ignition circuit except for the ignition-on interlock switch S1.

An advantage of having the travel control mechanical interlock held normally in retracted position is that it provides a fail-safe condition, the mechanical interlock being held in retracted position if there is a circuit failure and also being held in retracted position in all operating conditions of the vehicle except the restricted condition or conditions in which it is desired to have the interlock applied.

The seat and belt switch arrangement has fail-safe advantages in having the current off when the belts of occupied seats are fastened. There are also safety and reliability advantages in having the seat and belt switches for each seat in series and having the switches of different seats in parallel. This avoids having a long series circuit for the switches of all seats where failure anywhere along the extensive circuit could render the whole system inoperative.

There are also advantages in having one signal, such as a lamp, effective at all times and having another signal, such as a buzzer, effective only in travel conditions. During travel the driver might not readily notice a light but a buzzer would be more certain to attract attention.

While embodiments are shown in which there is an interlock in Park and Neutral and in Park, Reverse and Neutral positions, it will readily be evident how the interlock could be provided for the Park position alone, that now being the position commonly required for starting the engine, or for Park and Reverse. This is readily provided by suitable slots for the locking pin and suitable contact locations for actuating the locking pin.

While certain embodiments of the invention have been described for purposes of illustration, it is to be understood that there may be various embodiments and modifications within the general scope of the invention.

I claim:

1. A seat belt safety system for passenger vehicles, comprising in combination, an ignition circuit dependent only on the position of a travel selector, and a safety belt circuit which is energized when the engine starting switch is in the engine-run position, a seat switch and a seat belt switch, mechanical interlock means for retaining said travel selector in at least one selected position dependent upon the operating conditions of said seat switch and said seat belt switch, said mechanical interlock means being normally biased into non-locking position with respect to said travel selector and being biased into locking position with respect to said travel selector when said electro-mechanical means is projected, and said seat switch being normally open and becoming closed by seat occupancy, and said seat belt switch being normally closed and becoming opened when the belt of a seat is fastened, said seat switch and said seat belt switch being connected to said electro-mechanical means for projecting said mechanical interlock means into locking position when the travel selector is in a predetermined position of non-forward travel when both said seat switch and said seat belt switch are closed.

2. A seat belt safety system as set forth in claim 1, wherein said travel selector is controlled by a brake operator, and said mechanical interlock secures said brake operator in the brake-applied position until the belts of all occupied seats are fastened.

3. A seat belt safety system as set forth in claim 2, which further includes means to assure that the brake is applied and the travel selector in a predetermined non-forward-drive position before the ignition circuit can be energized.

4. A seat belt safety system as set forth in claim 1, which further includes a first indicator which is operative in all travel selector positions to indicate when the belt of an occupied seat is unfastened, and a second indicator which is rendered operative only in predetermined travel positions to indicate when the belt of any occupied seat is unfastened.

5. A safety belt system as set forth in claim 1, wherein said normally open seat switch and said normally closed belt switch are in series for each seat, and in which the switches for different seats are in parallel.

6. A seat belt safety system as set forth in claim 1, wherein said electro-mechanical means is actuated by a normally open switch of a relay coil controlled by said travel selector which closes said switch when the travel selector is in a predetermined non-forward-travel position.

7. A seat belt safety system as set forth in claim 6, which further includes a signal means responsive to seat and belt condition, and wherein said relay coil opens a normally closed switch in the circuit of said signal when it closes the switch of said electro-mechanical means.

* * * * *